United States Patent
Midya et al.

(10) Patent No.: US 10,015,038 B1
(45) Date of Patent: Jul. 3, 2018

(54) PULSE QUADRATURE MODULATOR AND METHOD

(71) Applicant: ADX Research, Inc., Schaumburg, IL (US)

(72) Inventors: Pallab Midya, Palatine, IL (US); Brian D Lindemann, Lake Saint Louis, MO (US); John Ribe, West Chicago, IL (US)

(73) Assignee: ADX Research, Inc., Schaumburg, IL (US)

( * ) Notice: Subject to any disclaimer, the term of this patent is extended or adjusted under 35 U.S.C. 154(b) by 0 days.

(21) Appl. No.: 15/392,957

(22) Filed: Dec. 28, 2016

(51) Int. Cl.
*H04L 27/36* (2006.01)
(52) U.S. Cl.
CPC ................... *H04L 27/362* (2013.01)
(58) Field of Classification Search
USPC .................. 375/219, 139; 370/396
See application file for complete search history.

(56) References Cited

U.S. PATENT DOCUMENTS

| | | | |
|---|---|---|---|
| 5,838,210 A | 11/1998 | Midya | |
| 6,130,910 A | 10/2000 | Anderson | |
| 6,587,010 B2 | 7/2003 | Wagh | |
| 6,614,323 B2 | 9/2003 | Wagh | |
| 6,801,082 B2 | 10/2004 | Midya | |
| 6,838,931 B2 | 1/2005 | Midya | |
| 6,940,893 B1* | 9/2005 | Pinkney | H04B 1/69 370/307 |
| 7,460,612 B2 | 12/2008 | Eliezer | |
| 7,532,679 B2 | 5/2009 | Staszewski | |
| 7,649,961 B2 | 1/2010 | Midya | |
| 7,872,543 B2 | 1/2011 | Ballantyne | |
| 8,179,957 B2 | 5/2012 | Bryant | |
| 8,368,451 B2* | 2/2013 | Mulawski | H03K 17/007 327/308 |
| 9,236,957 B2* | 1/2016 | Bolton | H04B 15/02 |
| 2007/0116015 A1* | 5/2007 | Jones | H03D 7/1441 370/396 |
| 2011/0255575 A1* | 10/2011 | Zhu | H04B 1/0475 375/219 |
| 2013/0243048 A1* | 9/2013 | Zhu | H04B 1/0475 375/219 |
| 2017/0222859 A1* | 8/2017 | Lehtinen | H04L 5/0053 |

* cited by examiner

*Primary Examiner* — Eva Puente
(74) *Attorney, Agent, or Firm* — Patents and Licensing LLC; Daniel W Juffernbruch

(57) ABSTRACT

A pulse quadrature modulator generates both alpha and beta binary signals, each one serial bit switched at an RF carrier frequency at a fraction of a high speed quantization clock. The alpha and beta binary signals each have respective alpha and beta pulse edges nominally occurring at two times the RF carrier frequency. The alpha and beta pulse edges alternate respectively. The alpha and beta pulse edges are each synchronized to the high speed quantization clock switched based on the baseband I and Q signal inputs. First and second switches gate a power signal using a respective of the alpha or beta binary signals to respectively produce first and second power outputs. The first and second switches differentially drive an RF load such as an antenna across the first and second power outputs having pulse edges at nominally at an integer multiple of four times the RF carrier frequency.

20 Claims, 18 Drawing Sheets

PULSE QUADRATURE MODULATOR AND METHOD

BACKGROUND OF THE INVENTIONS

1. Technical Field

The present inventions relate to a quadrature modulated bridge switching power stage that produces a modulated RF signal and, more particularly, relate to a pulse modulated bridge power stage for creating a quadrature modulated RF signal for RF transmission.

2. Description of the Related Art

Quadrature modulation is a method of transmitting a complex baseband signal using a single RF (radio frequency) frequency and an RF power amplifier. The power conversion efficiency of the RF power amplifier is a function of the RF signal envelope peak to average ratio. The power conversion efficiency can be as low as 10% for large peak to average ratio (10 dB). Even for an FM signal which is constant envelope with a peak to average ratio of 0 dB the power conversion efficiency is only about 50%. The remaining power is lost as heat and results in higher power consumption as well as cost and size of a system to eliminate the heat. There is also significant cost and complexity of the mostly analog circuitry to produce the modulated RF power signal.

SUMMARY OF THE INVENTION

Power consumption, directly or indirectly, contributes to a large portion of the cost of RF transmission. Even when the cost of the power consumed is low there is significant cost associated with elimination of the heat from a linear RF amplifier. It is therefore desirable to eliminate the linear RF amplifier and replace it with a switching RF stage. Further, the speed of digital circuits continues to go up and their cost continues to go down. Replacement of the RF mixer, the baseband DACs and the linear RF amplifier reduces cost of the solution while improving power conversion efficiency.

The inventions relate to methods and apparatus to convert a digital baseband signals to a pair of binary signals which switch at the RF carrier frequency. This conversion can be entirely in the digital domain.

To optimize the output power and power conversion it is desirable to switch at the carrier frequency. With a pair of switching signals there are four edges per RF carrier frequency cycle. The edges are created by counting a high speed quantization clock. This allows a relatively low resolution in the choice of the edges. However, using noise shaping techniques it is possible to get higher resolution.

The baseband I and Q signal inputs are input into the system in digital format. The bandwidth of these signals is relatively low. There are a large number of cycles of noise shaping available to create a modulated RF signal with high resolution.

The pair of digital switching signals are output to a switching RF stage which creates the amplified modulated signal with high power, high efficiency and high fidelity. The expensive and power hungry analog circuitry is largely eliminated.

Preferred embodiments for the switching RF power stage modulator have a pair of binary signals alpha binary signal of one serial bit and the beta binary signal of one serial bit. However, additional binary signals are possible with a total of four binary signals. In other embodiments, binary signals with higher multiples of two are possible Linearity and power conversion of a switching RF power stage are superior to that of a conventional RF lineup to create a modulated RF signal. As semiconductor processes improve the speed of digital circuits and switching circuits more RF systems can be implemented using this invention.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
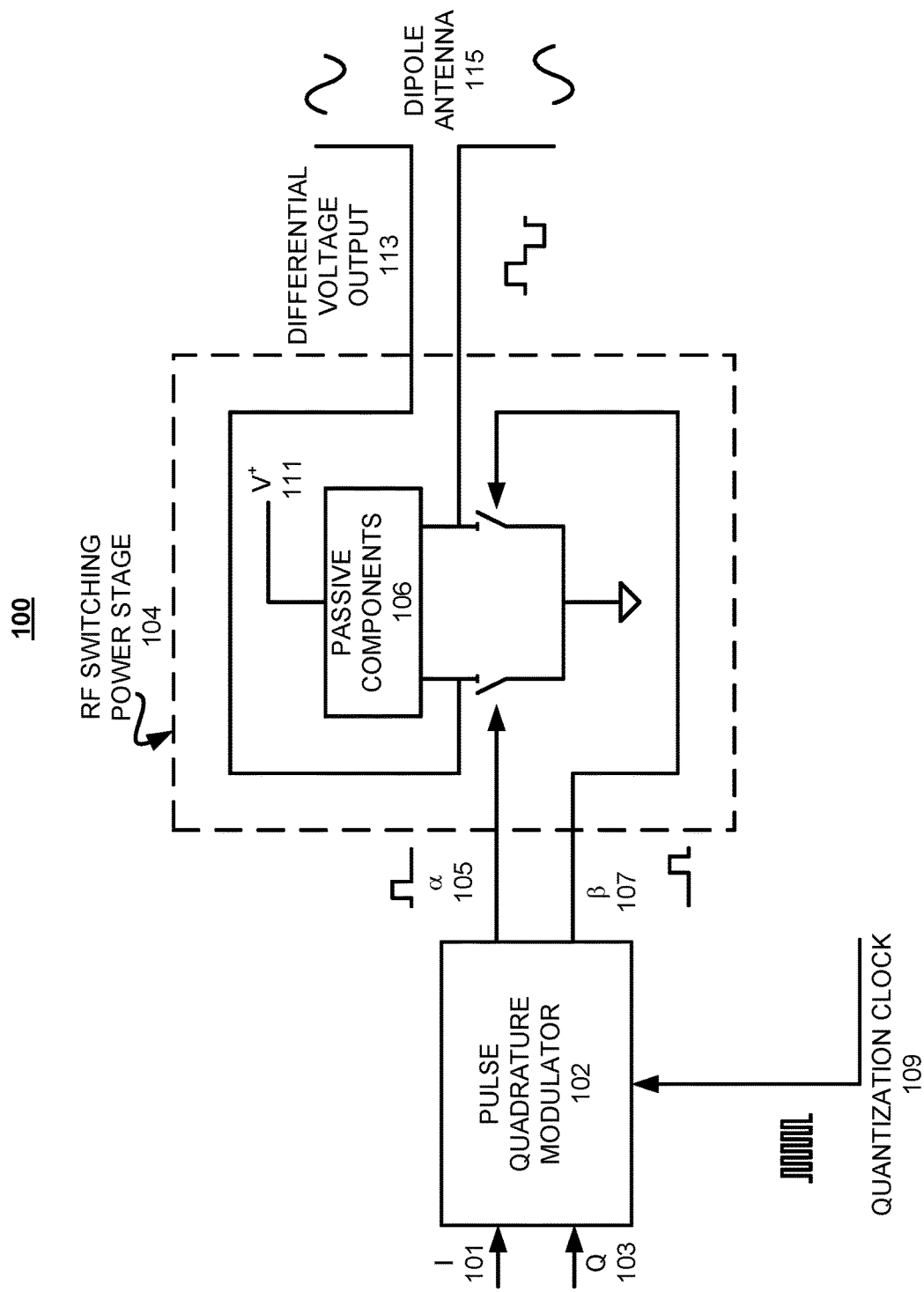
FIG. 1 illustrates a block diagram of the system switching RF power stage modulator driving dipole antenna according to embodiments of the present inventions.

FIG. 1 illustrates a block diagram of the system of a switching RF power stage modulator driving dipole antenna 100. A pulse quadrature modulator 102 takes inputs digital baseband I 101 and Q 103 and a high speed quantization clock 109 and generates two outputs alpha 105 and beta 107. Alpha 105 and beta 107 are binary signal of one serial bit switched at the RF carrier frequency for driving the pair of switches. Note that the alpha signal and the beta signal switch at different times. There is an up transition and a down transition for both signals in a period of the RF carrier frequency. Thus there is a single transition at four times the RF carrier frequency. In other words there is an alpha pulse edge nominally occurring at a rate two times the RF carrier frequency and a beta pulse edge nominally occurring at a rate two times the RF carrier frequency. The RF carrier frequency period is divided into four equal quarters and alpha or beta transitions every quarter of the period of the RF carrier frequency. In embodiments the RF carrier frequency can be a predetermined RF carrier frequency value. The alpha pulse edge and the beta pulse edge are switched based on the baseband I and Q signal inputs. The alpha pulse edge and the beta pulse edge are synchronized to the high speed quantization clock.

Inside RF Switching power stage 104, two switches are both connected to ground and connected with passive components 106 to power supply voltage $V^+$ 111. The first switch produces a first power output and the second switch produces a second power output. The power is obtained from a power source the power supply voltage V+ with high power conversion efficiency. Dipole antenna 115 is connected to the two switches. The differential RF signal output 113 is the signal waveform driving the dipole antenna 115. The signal transmitted by the dipole antenna is a modulated sine wave at the RF carrier frequency.

Figure 2:
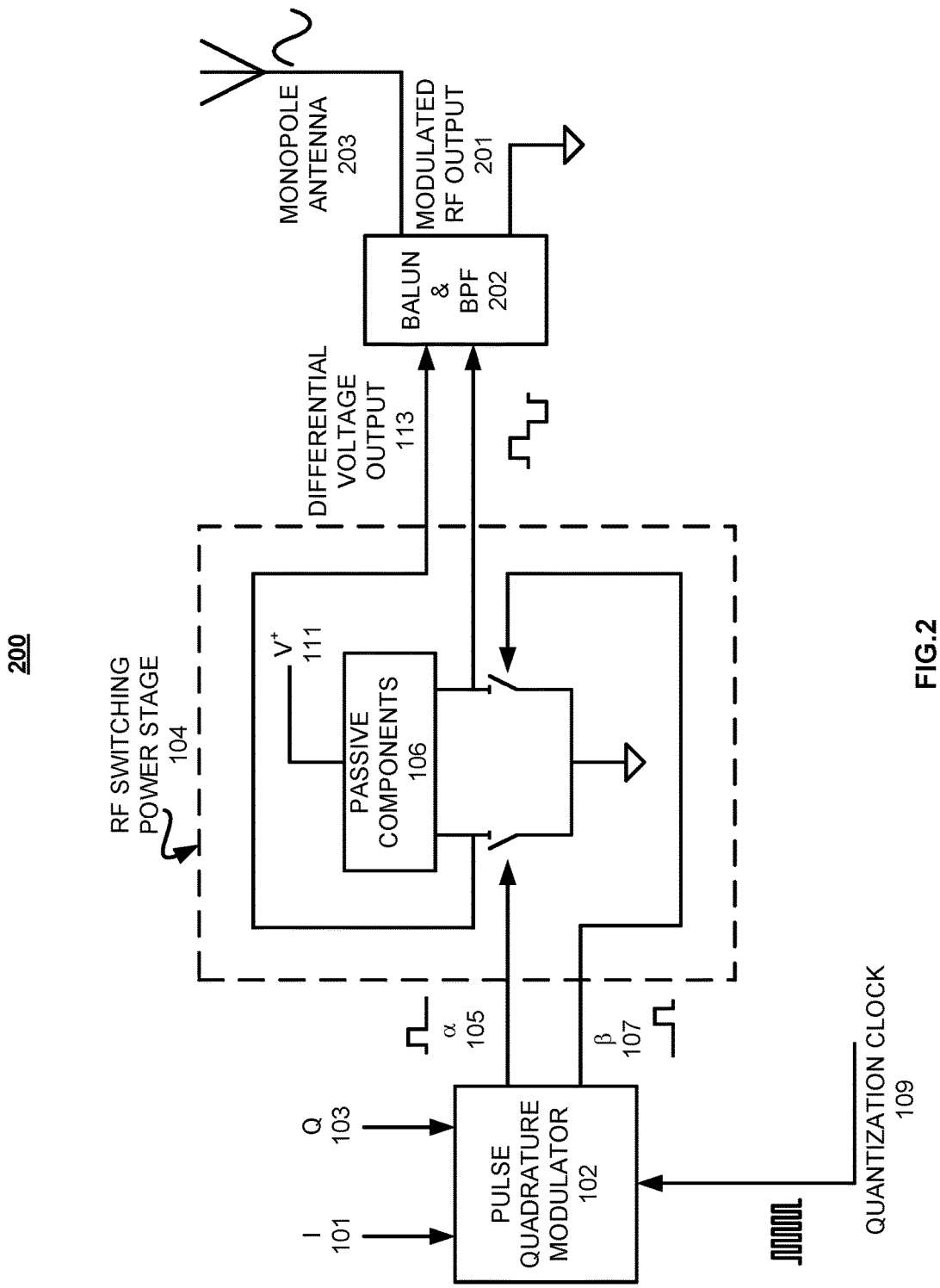
FIG. 2 illustrates a block diagram of the system switching RF power stage modulator driving monopole antenna according to embodiments of the present inventions.

FIG. 2 illustrates a block diagram of the system of a switching RF power stage modulator driving monopole antenna 200. A pulse quadrature modulator 102 takes input digital baseband I 101 and Q 103 and a high speed quantization clock 109 and generates two outputs alpha 105 and beta 107. Alpha 105 and beta 107 are binary signal of one serial bit switched at the RF carrier frequency for driving the two switches. Note that the alpha signal and the beta signal switch at different times. There is an up transition and a down transition for both signals in a period of the RF carrier frequency. Thus there is a single transition at four times the RF carrier frequency. In other words there is an alpha pulse edge nominally occurring at a rate two times the RF carrier frequency and a beta pulse edge nominally occurring at a rate two times the RF carrier frequency. The RF carrier frequency period is divided into four equal quarters and alpha or beta transitions every quarter of the period of the RF carrier frequency.

Inside RF Switching power stage 104, two switches are both connected to ground and connected with passive components 106 to power supply voltage $V^+$ 111. The first switch produces a first power output and the second switch produces a second power output. The power is obtained from a power source the power supply voltage V+ with high power conversion efficiency. The differential voltage output 113 is the differential RF signal output driving the Balun and BPF (band pass filter) 202. The output of the Balun and BPF 202 are connected to the monopole antenna 203 and ground. Modulated RF output 201 is a modulated sine wave signal at the monopole antenna 203. The alpha pulse edge and the beta pulse edge are switched based on the baseband I and Q signal inputs. The alpha pulse edge and the beta pulse edge are synchronized to the high speed quantization clock.

Figure 3:
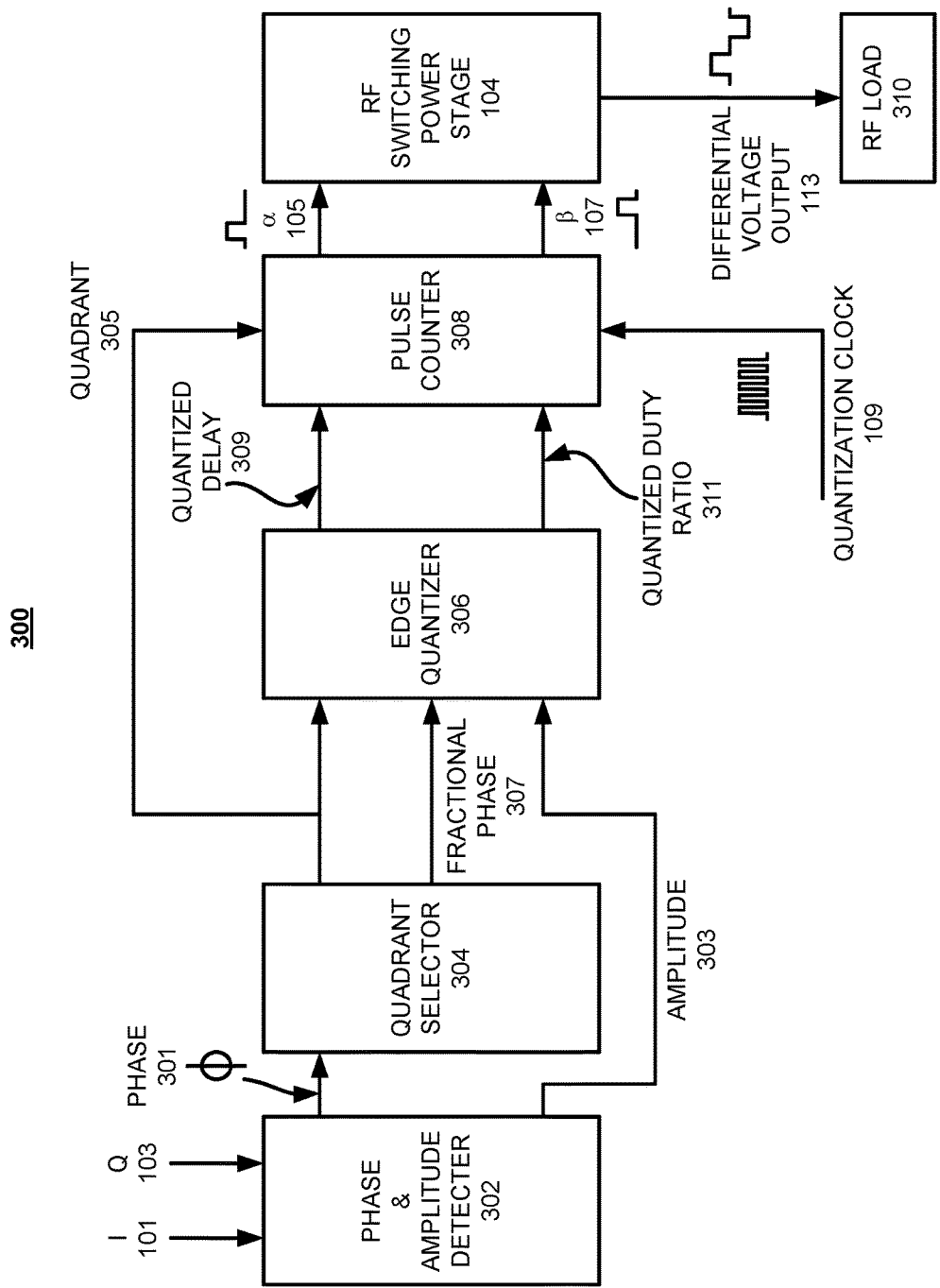
FIG. 3 illustrates a detailed block diagram of the system Controller for Pulse Quadrature Modulation according to embodiments of the present inventions.

FIG. 3 illustrates a detailed block diagram of the system of a Pulse Quadrature Modulator 300 with phase and amplitude detector 302, quadrant selector 304, edge quantizer 306 and pulse counter 308. The phase and amplitude detector 302 has two digital baseband inputs I 101 and Q 103 generate two outputs in the form of φ phase 301 and amplitude 303. Note that the RF carrier frequency period is divided into four equal quarters and alpha or beta transitions every quarter. So it is advantageous to input digital baseband inputs I 101 and Q 103 at this rate. Typically the digital baseband inputs I 101 and Q 103 are not available at this high rate but they can be upsampled to this rate using conventional upsampling techniques.

The φ phase 301 is an input for quadrant selector 304 and amplitude 303 is an input for edge quantizer 306. The two outputs of quadrant selector 304 are inputs for edge quantizer 306. They are fractional phase 307 and quadrant 305. The signal quadrant 305 is also connected as an input for pulse counter 308. Edge quantizer 306 takes three inputs quadrant 305, fractional phase 307, and amplitude 303 and generates two outputs quantized delay 309 and quantized duty ratio 311. These two outputs are connected with pulse counter 308. Pulse counter 308 has four inputs quadrant 305, quantized delay 309, quantized duty ratio 311 and high speed quantization clock 109, and generates two outputs alpha 105 and beta 107. RF Switching power stage 104 takes inputs alpha 105 and beta 107 and generates output differential voltage output 113 which is going to RF load 310.

Other embodiments may have four or greater even number of outputs instead of two outputs alpha 105 and beta 107. Larger number of outputs would require larger number of switches. However, with larger number of outputs higher performance would be achieved without reducing the power conversion efficiency of the system.

Note that the quadrant signal has four possible values namely 1, 2, 3 and 4. This corresponds to the four quadrants of the digital baseband inputs I 101 and Q 103. For example, if I and Q are both positive the quadrant is 1, if I is negative and Q is positive the quadrant is 2, if I is negative and Q is negative the quadrant is 3 and if I is positive and Q is negative the quadrant is 4.

Also note that the quarter signal has four possible values namely 1, 2, 3 and 4. It is 1 for the first ¼ of a period of the RF carrier frequency. It is 2 for the second ¼ of the period of the RF carrier frequency. It is 3 for the third ¼ of the period of the RF carrier frequency. It is 4 for the last ¼ of the period of the RF carrier frequency.

Figure 4:
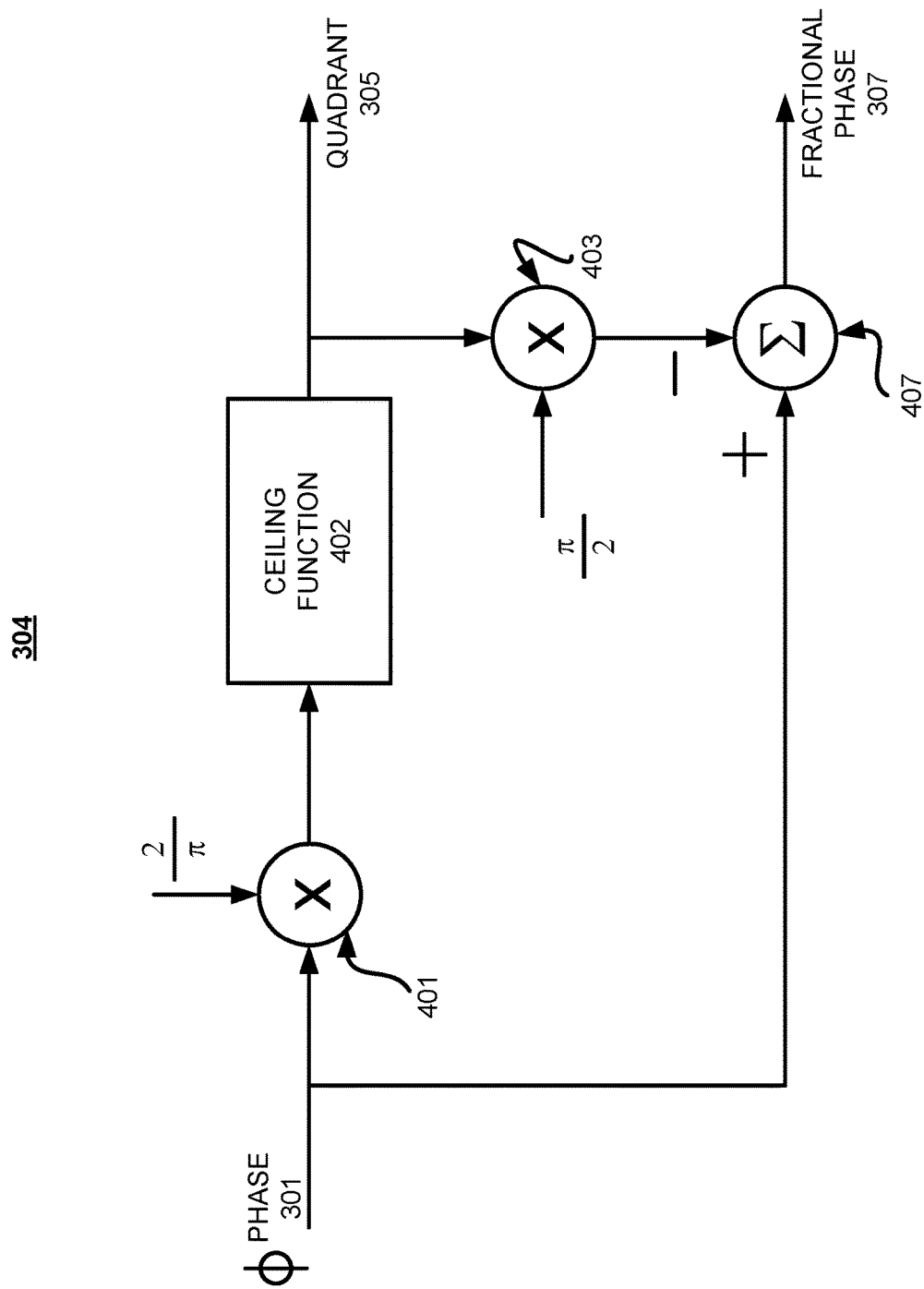
FIG. 4 illustrates signals of the Quadrant Selector schematic according to embodiments of the present inventions.

FIG. 4 illustrates a schematic diagram of the system for quadrant selector 304. The ceiling function 402 takes input from multiplier 401 and generate output quadrant 305. Multiplier 401 takes input in the form of phase 301 and 2/pi and produces output Phase times 2/pi. The phase is a number between 0 and 2pi. By this multiplication and the ceiling function an integer between one and four is obtained which corresponds to the four quadrants of the digital baseband signal pair (I, Q). These operations determine which of the four quadrant of the digital baseband inputs I 101 and Q 103 lie in when plotted as (I,Q) on a conventional coordinate plane.

The Phase signal is also connected in positive mode with Summation Σ 407. Summation Σ 407 have two signed inputs with the output of the multiplier 403 is subtracted from the Phase 301 to generate the output fractional phase 307. The fractional phase is the relative phase within a quadrant of the digital baseband signal pair (I, Q). Multiplier 403 takes two inputs pi/2 and quadrant 305 and produces an integer multiple of pi/2.

Figure 5:
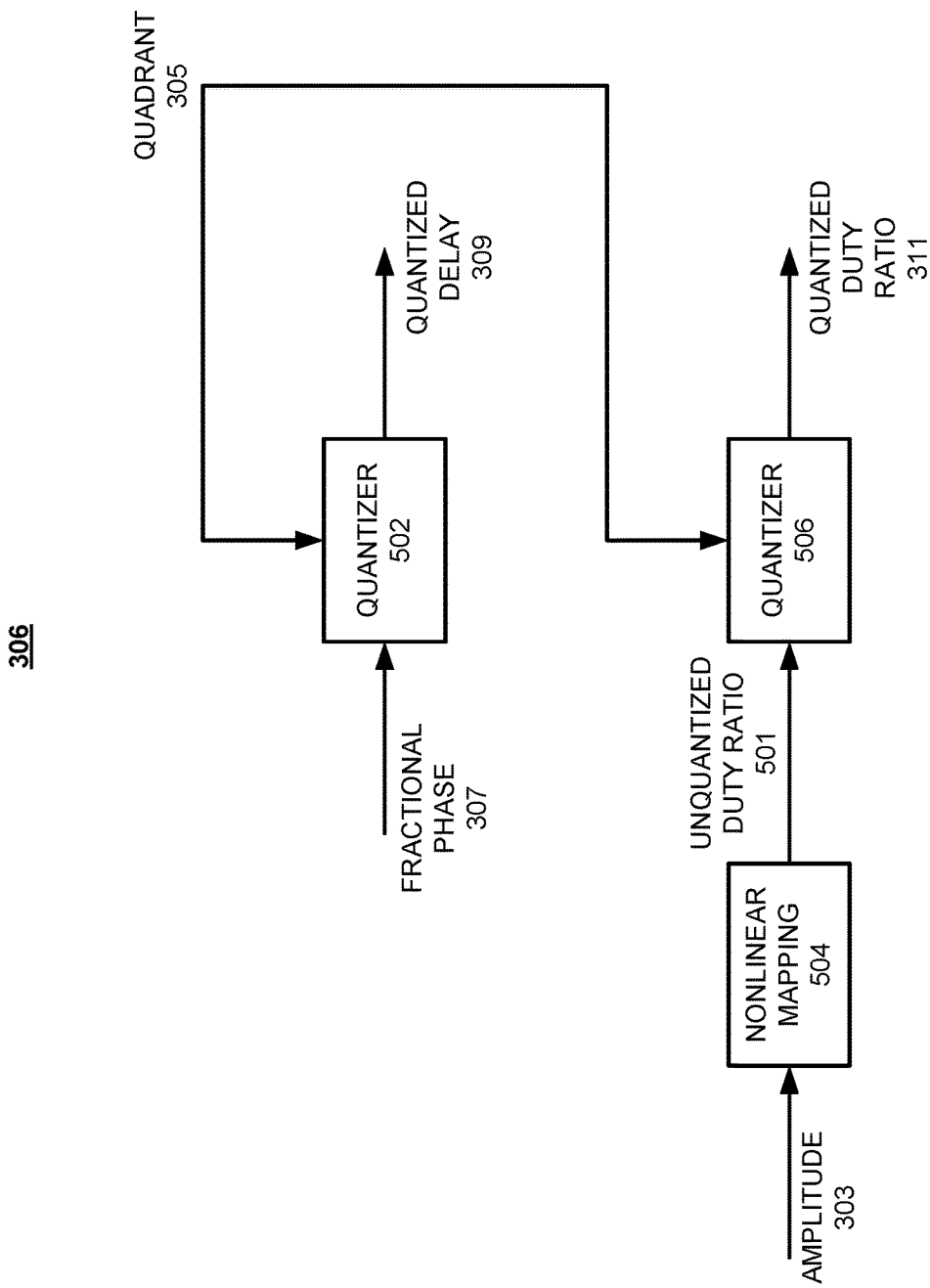
FIG. 5 illustrates signals of the Edge Quantizer according to embodiments of the present inventions.

FIG. 5 illustrates a block diagram of the system for edge quantizer 306. Quantizer 502 takes two input from fractional phase 307 and quadrant 305 and generate output quantized delay 309. Nonlinear mapping 504 takes input as form of amplitude 303 and generate output unquantized duty ratio 501 which will input for quantizer 506. Amplitude is maximum at duty ratio of half. Amplitude is zero at duty ratio of half. However, at intermediate points there is a nonlinear sinusoidal relationship. Quantizer 506 takes two input from unquantized duty ratio 501 and quadrant 305 and generate output quantized duty ratio 311. Quantization is to reduce the bit width of the signals so that binary signal of one serial bit switched at the RF carrier frequency alpha 105 and beta 107 can be created by counting the high speed quantization clock 109. Quantization causes noise which may not be desirable in the frequencies around the RF carrier frequency. Using noise shaping techniques the quantization noise can be shaped out of the frequency band around the RF carrier frequency. Frequencies away from the RF carrier frequency can be suppressed using the BPF. The antenna and the balun also have an inherent band pass characteristic.

Figure 6:
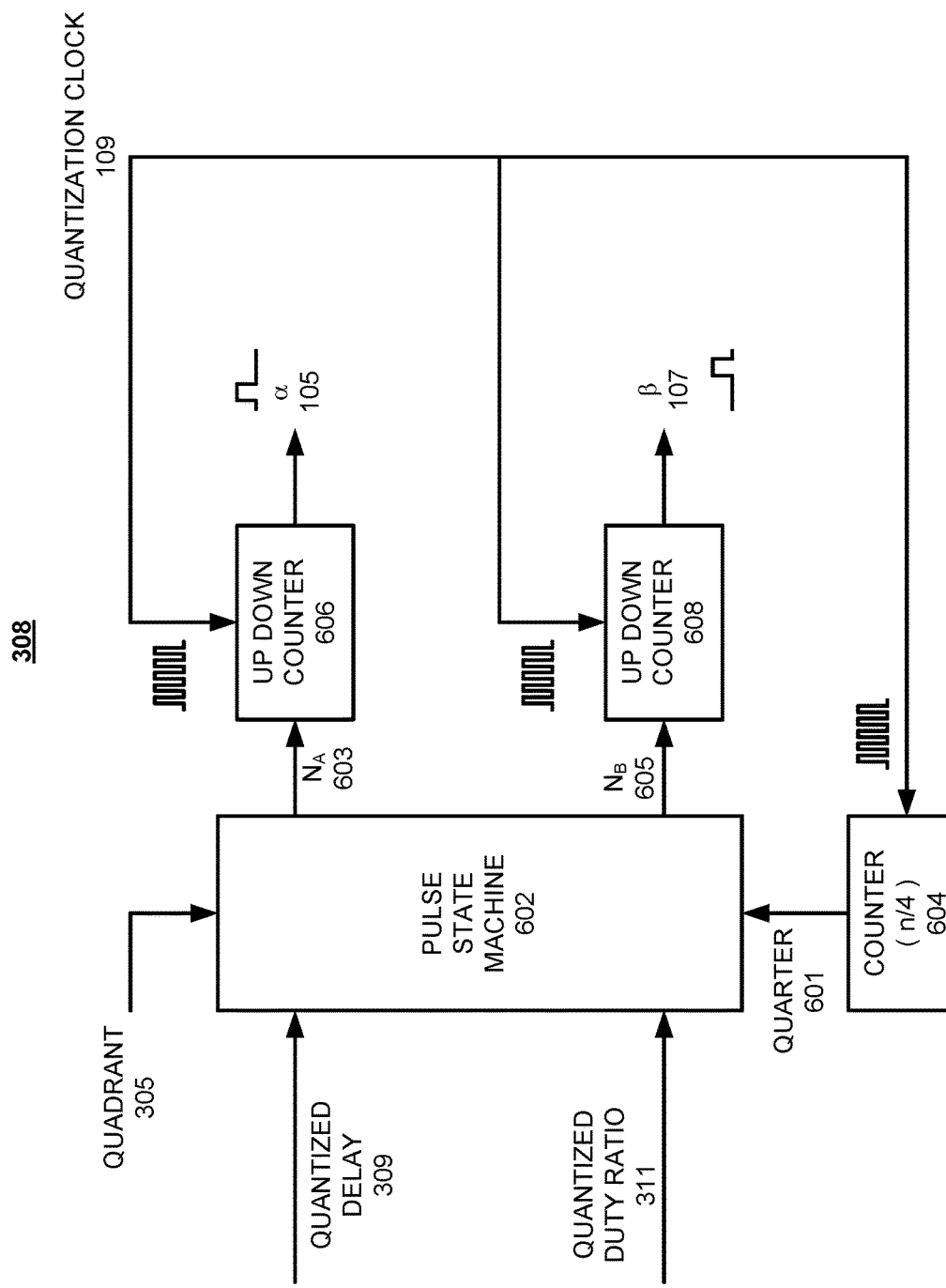
FIG. 6 illustrates signals of the Pulse Counter according to embodiments of the present inventions.

FIG. 6 illustrates a block diagram of the system for pulse counter 308. Pulse state machine 602 takes four input from quantized delay 309, quantized duty ratio 311, quadrant 305 and quarter 601. An n/4 counter 604 has input high speed quantization clock 109 and output the signal quarter 601. The quarter goes 1 through 4 and is input for Pulse state machine 602. The Pulse state machine 602 and generates two outputs $N_A$ 603 and $N_B$ 605 which will inputs for up down counter 606 and up down counter 608. Up down counter 606 takes input in the form of $N_A$ 603 from pulse state machine 602 and high speed quantization clock 109 and generates output alpha 105. Up down counter 608 takes input in the form of $N_B$ 605 from pulse state machine 602 and high speed quantization clock 109 and generates output beta 107.

Figure 7:
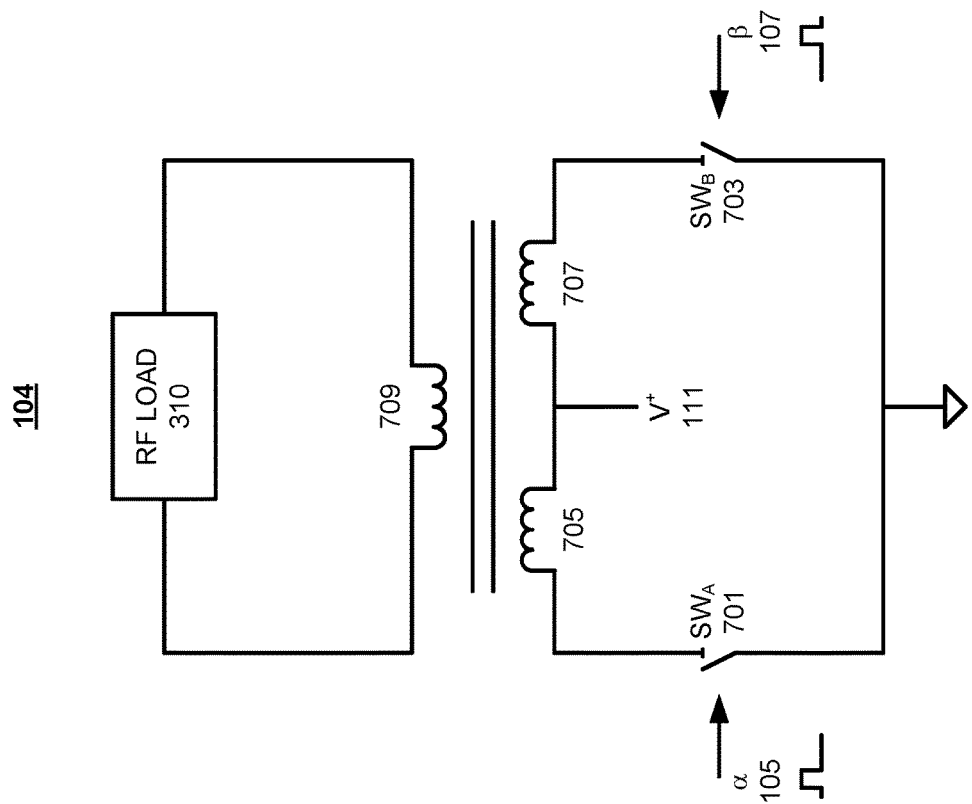
FIG. 7 illustrates a circuit diagram of the RF switching Power stage with transformer according to embodiments of the present inventions.

FIG. 7 illustrates a schematic diagram of the system of RF switching Power stage with transformer 104, switch $SW_A$ 701 is a low side switch connected to the transformer primary winding 705 and to ground. Voltage $V^+$ 111 is connected to transformer primary winding 705 and transformer primary winding 707. Switch $SW_B$ 703 is a low side switch connected to the transformer primary winding 707 and to ground. Signal alpha 105 controls $SW_A$ 701 and signal beta 107 controls switch $SW_B$ 703. RF load 310 is parallel connected to transformer secondary 709. The transformer provides, isolation and impedance transformation. The transformer may also provide a bandpass action allowing only frequencies close to the RF carrier frequency to pass.

Figure 8:
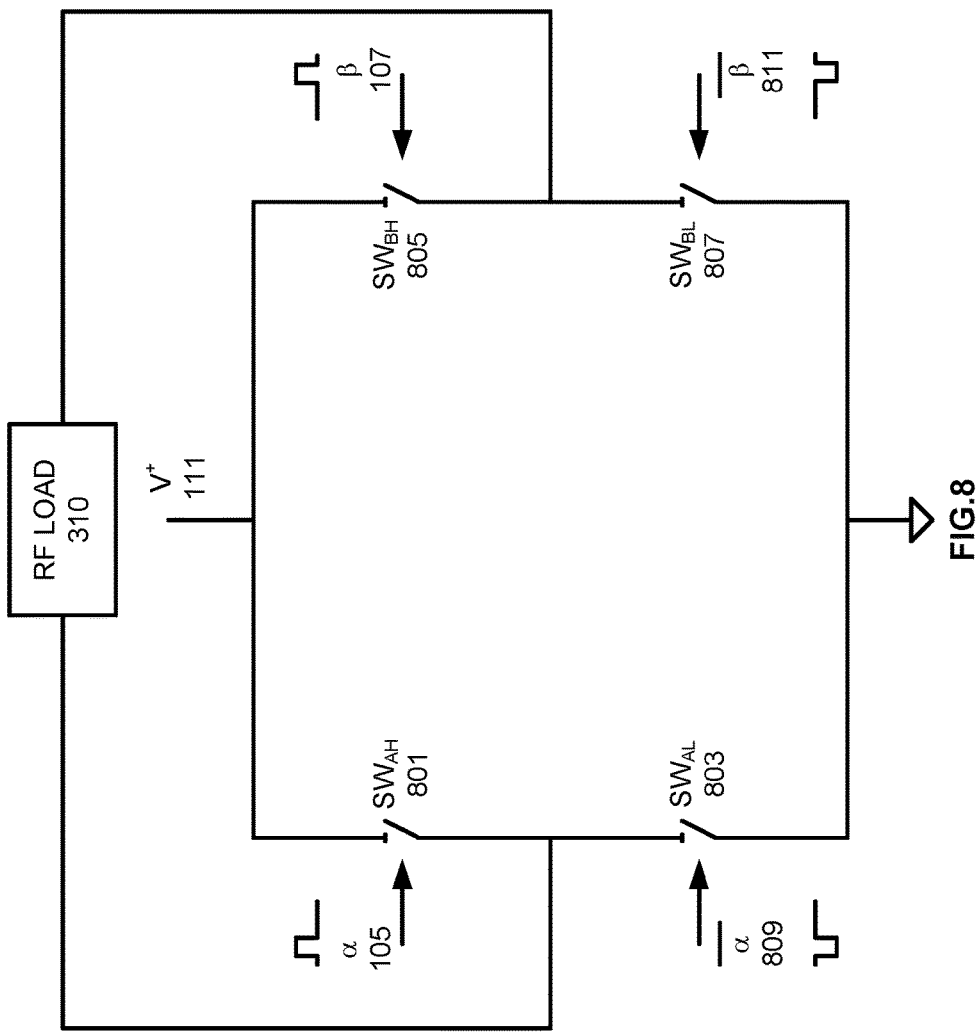
FIG. 8 illustrates a circuit diagram of the RF switching transformerless Power stage according to embodiments of the present inventions.

FIG. 8 illustrates a schematic diagram of the system of RF switching transformerless Power stage 104, RF load 310 is connected between the four switches $SW_{AH}$ 801, $SW_{AL}$ 803, $SW_{BH}$ 805, and $SW_{BL}$ 807 which are connected in an H-bridge. Alpha 105 controls switch $SW_{AH}$ 801, beta 107 controls switch $SW_{BH}$ 805. Alpha bar 809 controls switch $SW_{AL}$ 803, beta bar 811 controls switch $SW_{BL}$ 807. Voltage $V^+$ 111 is connected to the high side of the switches $SW_{AH}$ 801 and $SW_{BH}$ 805. Ground is connected to the low side of the switches $SW_{AL}$ 803 and $SW_{BL}$ 807.

Figure 9:
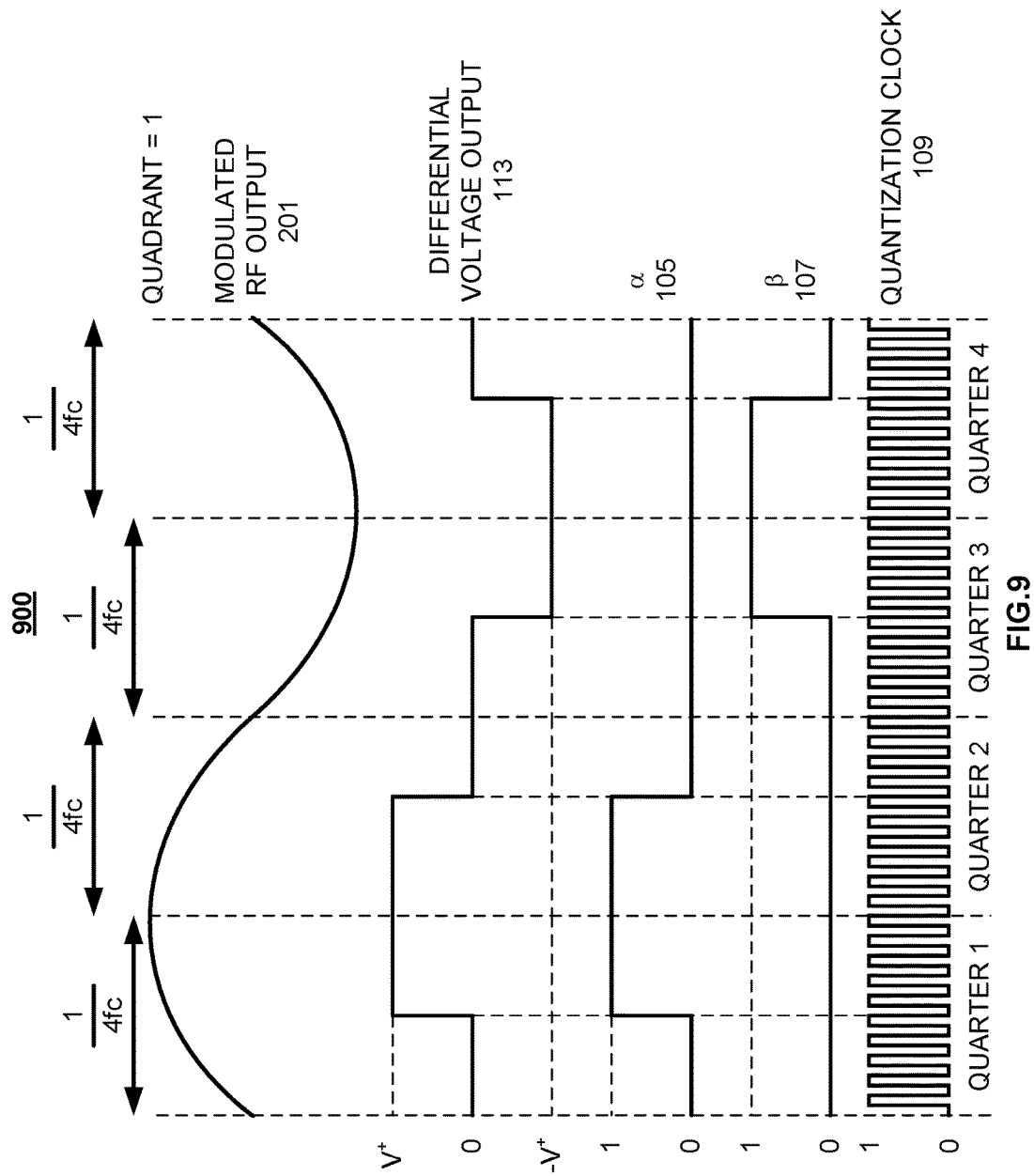
FIG. 9 illustrates signal waveforms for power stage with transformer of the circuit of FIG. 7 for (I, Q) in first quadrant according to embodiments of the present inventions.

FIG. 9 illustrates a timing diagram over time of signal waveforms for power stage with transformer for (I, Q) in first quadrant 900. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 9 corresponds to the digital baseband signals (I, Q) being in the first quadrant. These waveforms are for a power stage with a transformer.

Figure 10:
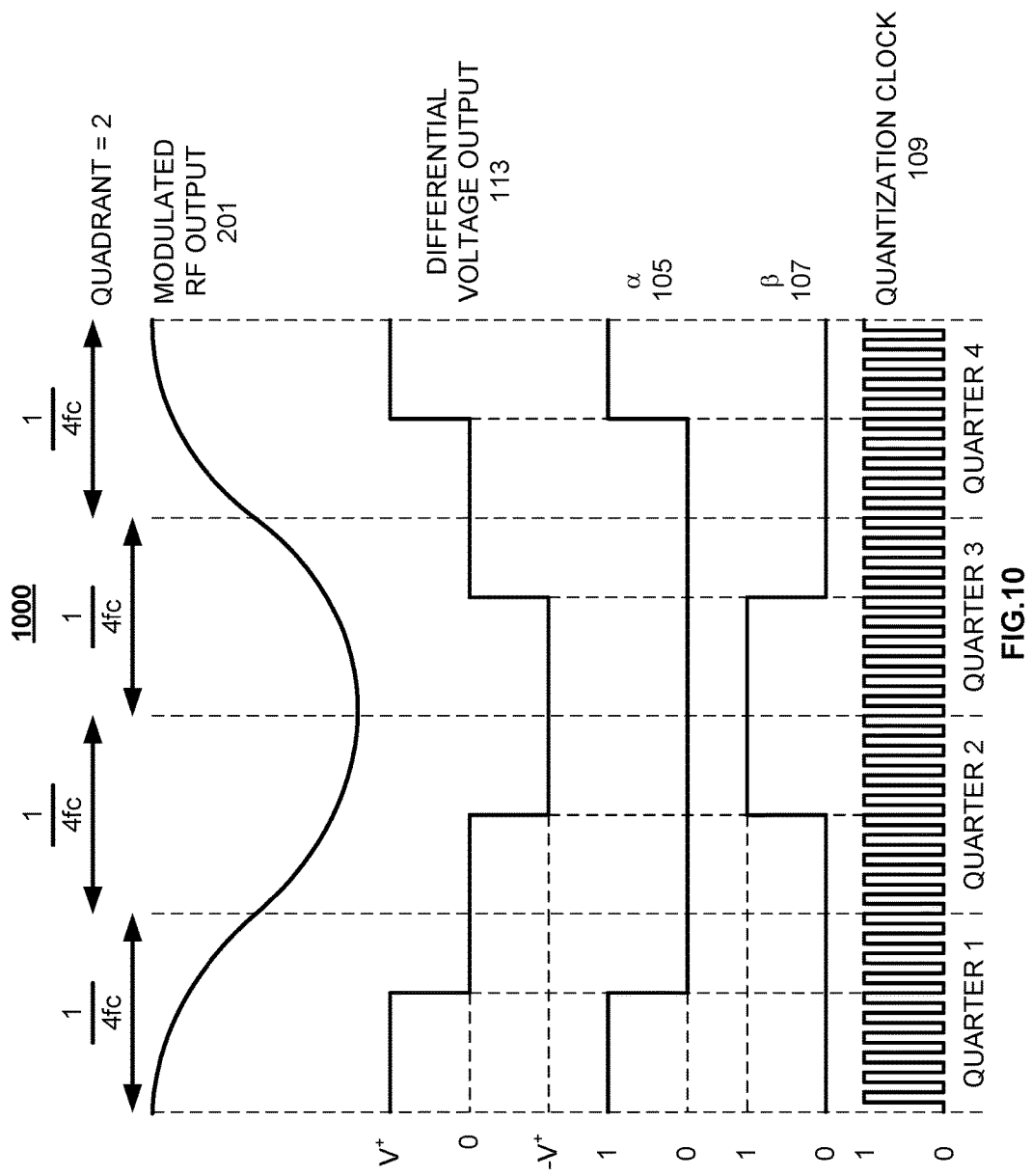
FIG. 10 illustrates signal waveforms for power stage with transformer of the circuit of FIG. 7 for (I, Q) in second quadrant according to embodiments of the present inventions.

FIG. 10 illustrates a Timing diagram over time of signal waveforms for power stage with transformer for (I, Q) in second quadrant 1000. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 9 corresponds to the digital baseband signals (I, Q) being in the second quadrant. These waveform are for a power stage with a transformer.

Figure 11:
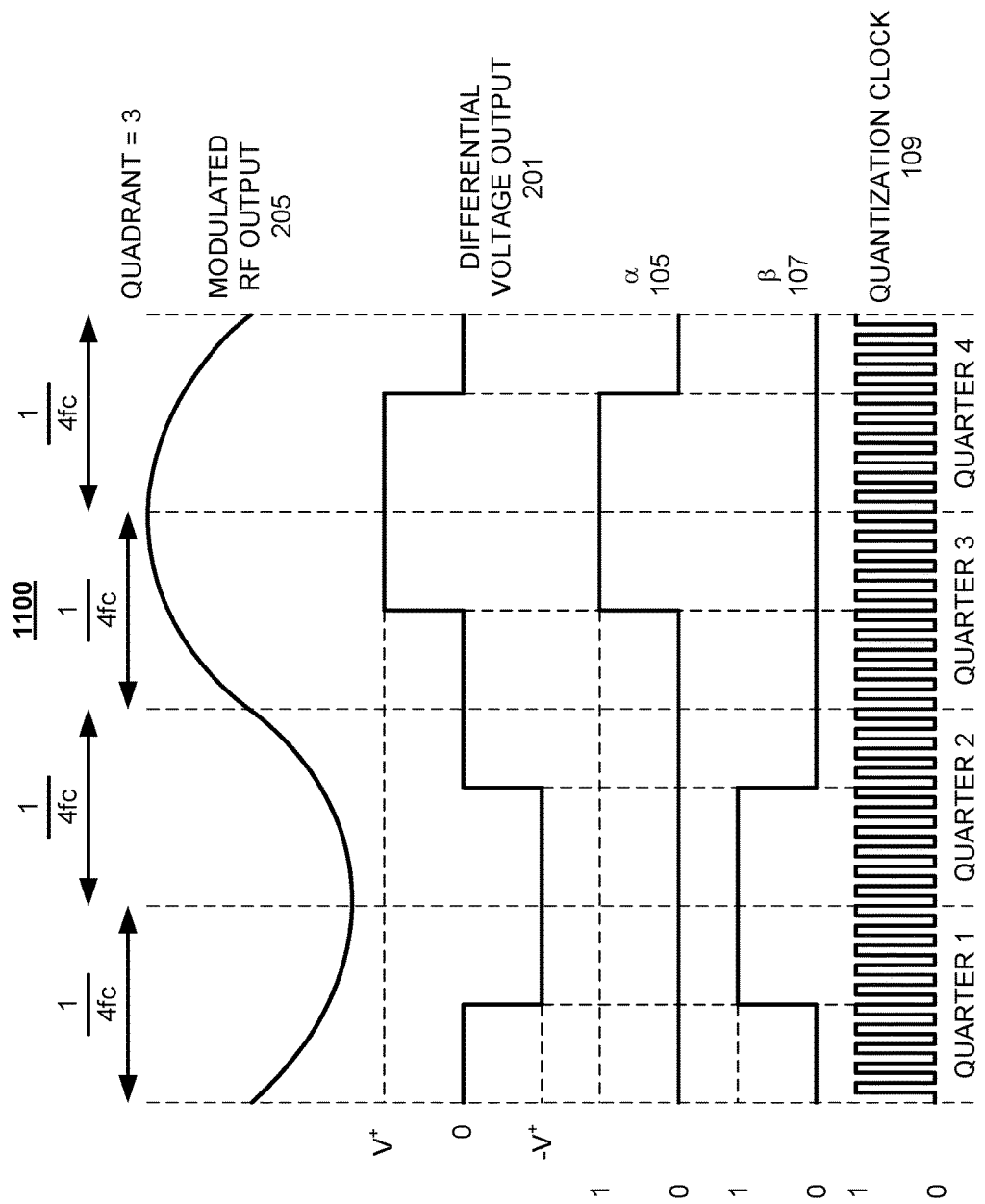
FIG. 11 illustrates signal waveforms for power stage with transformer of the circuit of FIG. 7 for (I, Q) in third quadrant according to embodiments of the present inventions.

FIG. 11 illustrates a Timing diagram over time of signal waveforms for power stage with transformer for (I, Q) in third quadrant 1100. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 9 corresponds to the digital baseband signals (I, Q) being in the third quadrant. These waveform are for a power stage with a transformer.

Figure 12:
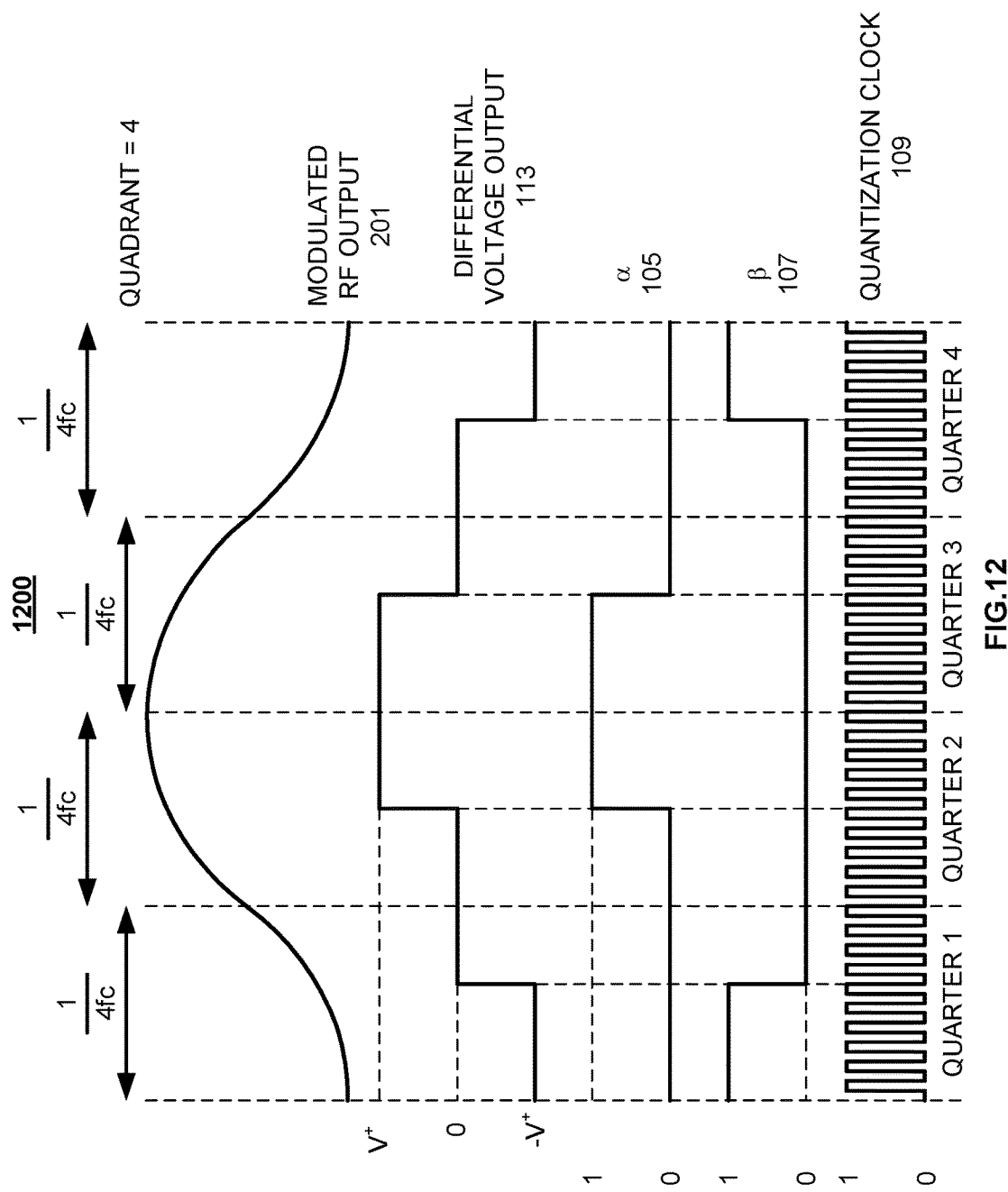
FIG. 12 illustrates signal waveforms for power stage with transformer of the circuit of FIG. 7 for (I, Q) in fourth quadrant according to embodiments of the present inventions.

FIG. 12 illustrates a Timing diagram over time of signal waveforms for power stage with transformer for (I, Q) in fourth quadrant 1200. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 9 corresponds to the digital baseband signals (I, Q) being in the fourth quadrant. These waveforms are for a power stage with a transformer.

Figure 13:
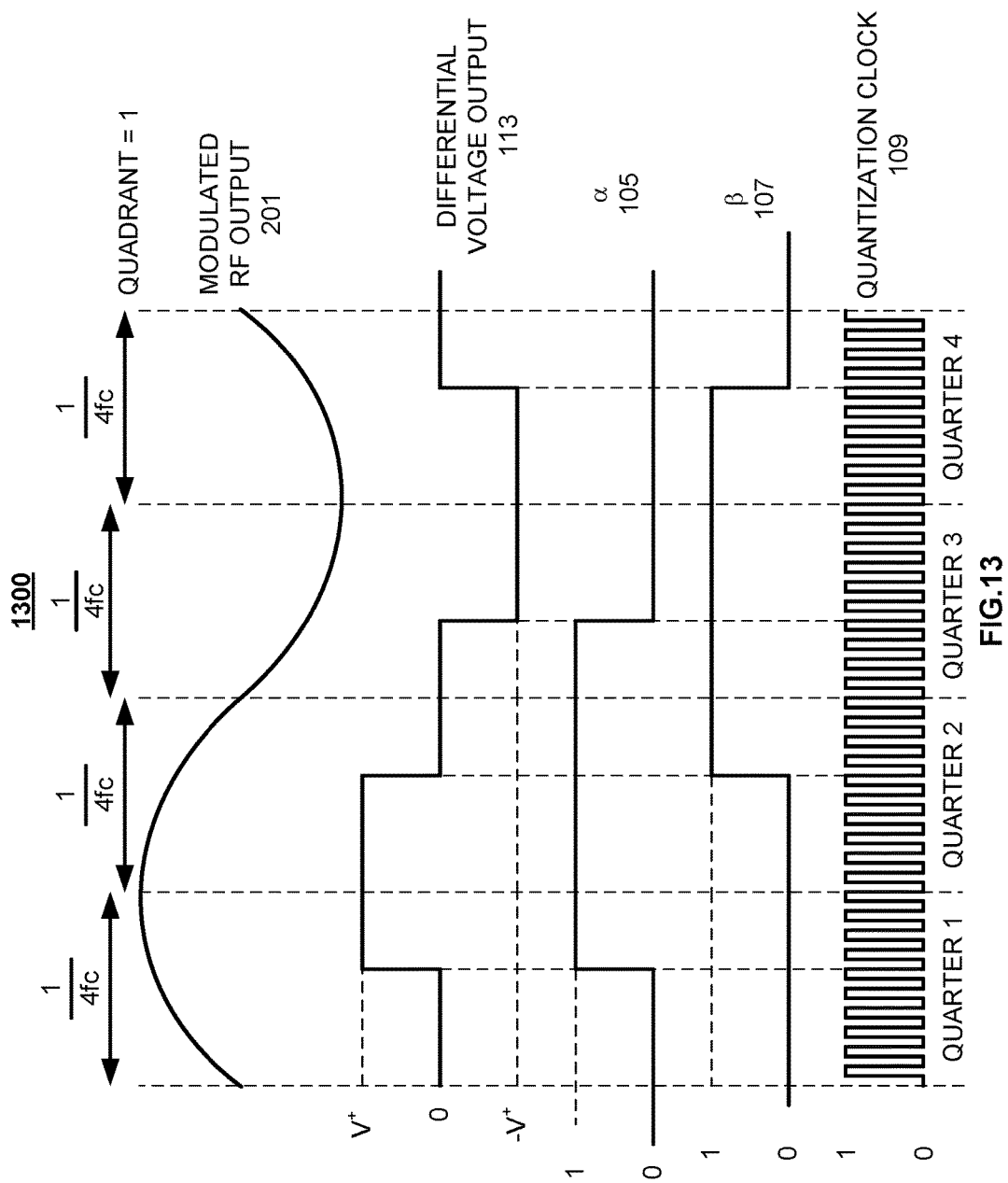
FIG. 13 illustrates signal waveforms for a transformerless power stage of the circuit of FIG. 8 for (I, Q) in first quadrant according to embodiments of the present inventions.

FIG. 13 illustrates a Timing diagram over time of signal waveforms for power stage without transformer for (I, Q) in first quadrant 1300. The digital baseband signals I, Q sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 13 corresponds to the digital baseband signals (I, Q) being in the first quadrant. These waveforms are for a power stage without transformer.

Figure 14:
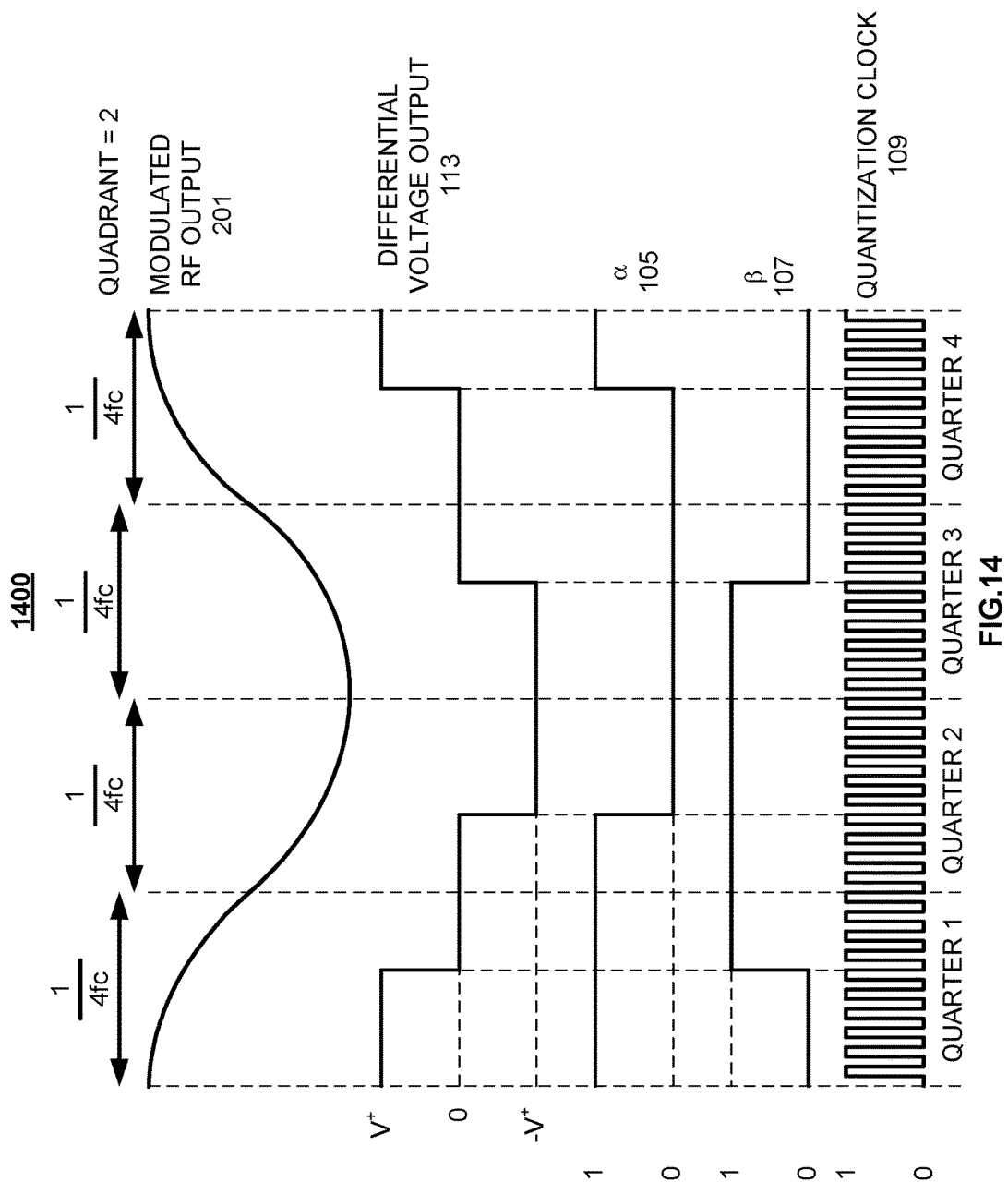
FIG. 14 illustrates signal waveforms for a transformerless power stage of the circuit of FIG. 8 for (I, Q) in second quadrant according to embodiments of the present inventions.

FIG. 14 illustrates a Timing diagram over time of signal waveforms for power stage without transformer for (I, Q) in second quadrant 1400. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 13 corresponds to the digital baseband signals (I, Q) being in the second quadrant. These waveforms are for a power stage without transformer.

Figure 15:
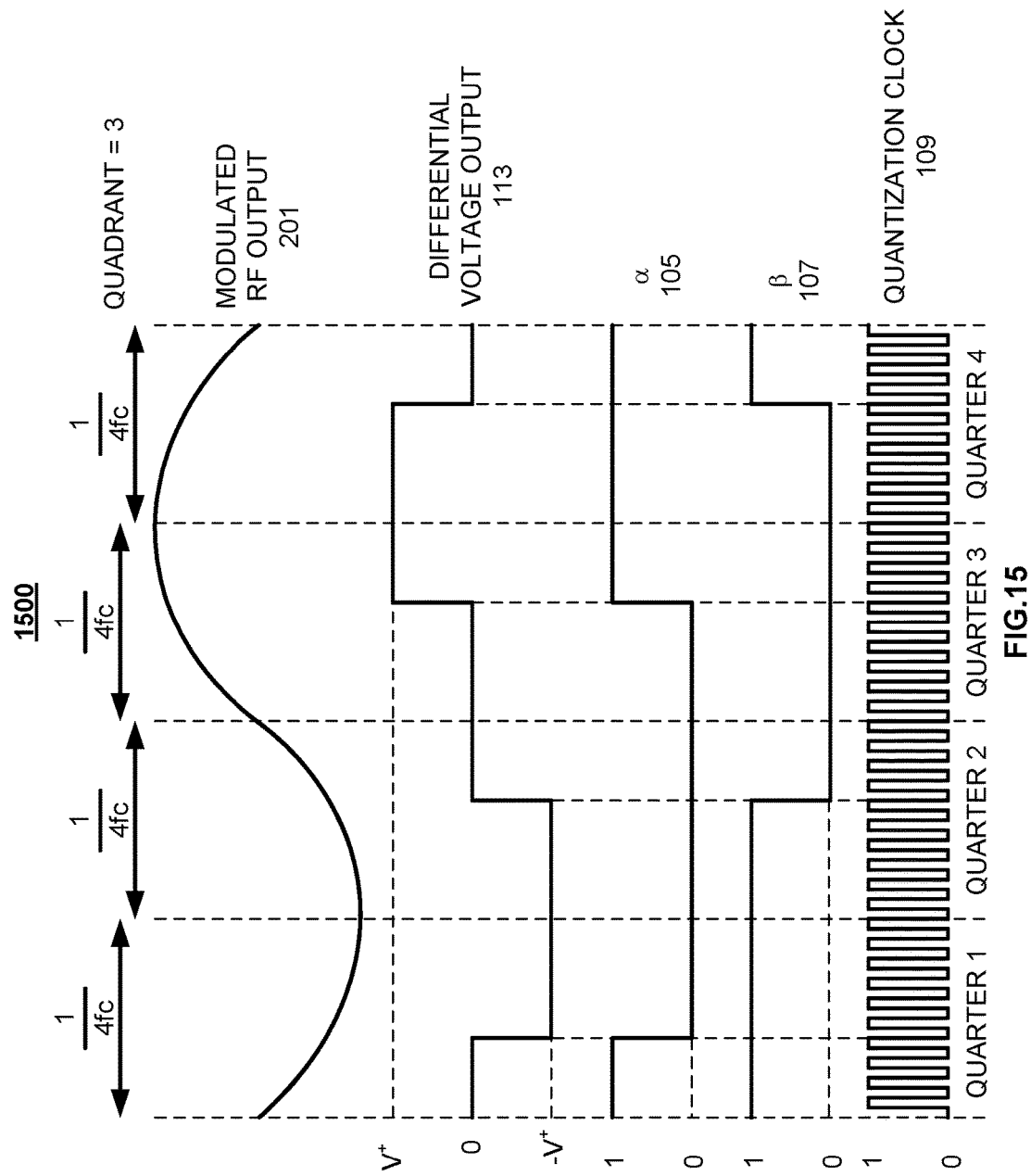
FIG. 15 illustrates signal waveforms for a transformerless power stage of the circuit of FIG. 8 for (I, Q) in third quadrant according to embodiments of the present inventions.

FIG. 15 illustrates a Timing diagram over time of signal waveforms for power stage without transformer for (I, Q) in third quadrant 1500. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 15 corresponds to the digital baseband signals (I, Q) being in the third quadrant. These waveforms are for a power stage without transformer.

Figure 16:
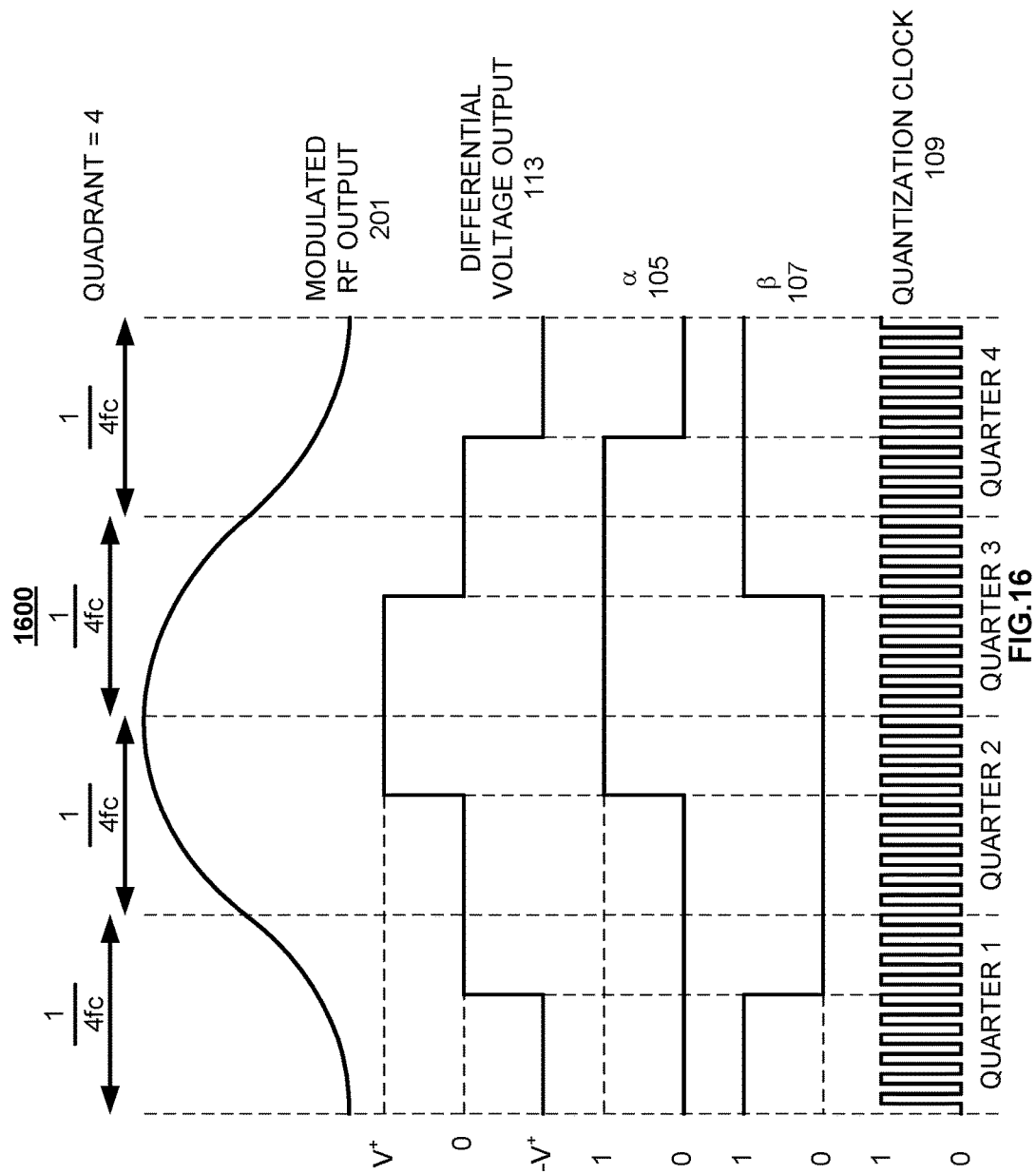
FIG. 16 illustrates signal waveforms for a transformerless power stage of the circuit of FIG. 8 for (I, Q) in fourth quadrant according to embodiments of the present inventions.

FIG. 16 illustrates a Timing diagram over time of signal waveforms for power stage without transformer for (I, Q) in fourth quadrant 1600. The digital baseband signals (I, Q) sampled at four times the switching frequency is mapped to four edges of the pair of alpha and beta signals. As the duty ratio and fractional phase vary the precise location of the alpha and beta edges vary but the states at the four quarters are known for the entire range of duty ratios and fractional phase values. In each quarter of the alpha and beta cycle there is exactly one edge of one the two alpha and beta signals. The signals are shown for a complete period of the RF carrier frequency and divided into four quarters. Note that the quarter signal has value 1 in the first ¼ period of the RF carrier frequency, it has value 2 in the second ¼ period of the RF carrier frequency, it has value 3 in the third ¼ period of the RF carrier frequency and it has value 4 in the last ¼ period of the RF carrier frequency.

The top waveform is the Modulated RF Output 201. The next lower waveform is the Differential Voltage Output 113. This signal has three possible values, V+, 0 and −V+. The next waveform is the alpha signal 105. This is a binary signal with 0 and 1 as possible values. The next waveform is the beta signal 107. This is also a binary signal with 0 and 1 as possible values. The bottom waveform is the Quantization Clock 109. It is a high frequency clock and all edges of alpha and beta are synchronized to an edge of this clock signal. FIG. 16 corresponds to the digital baseband signals (I, Q) being in the fourth quadrant. These waveforms are for a power stage without transformer.

Figure 17:
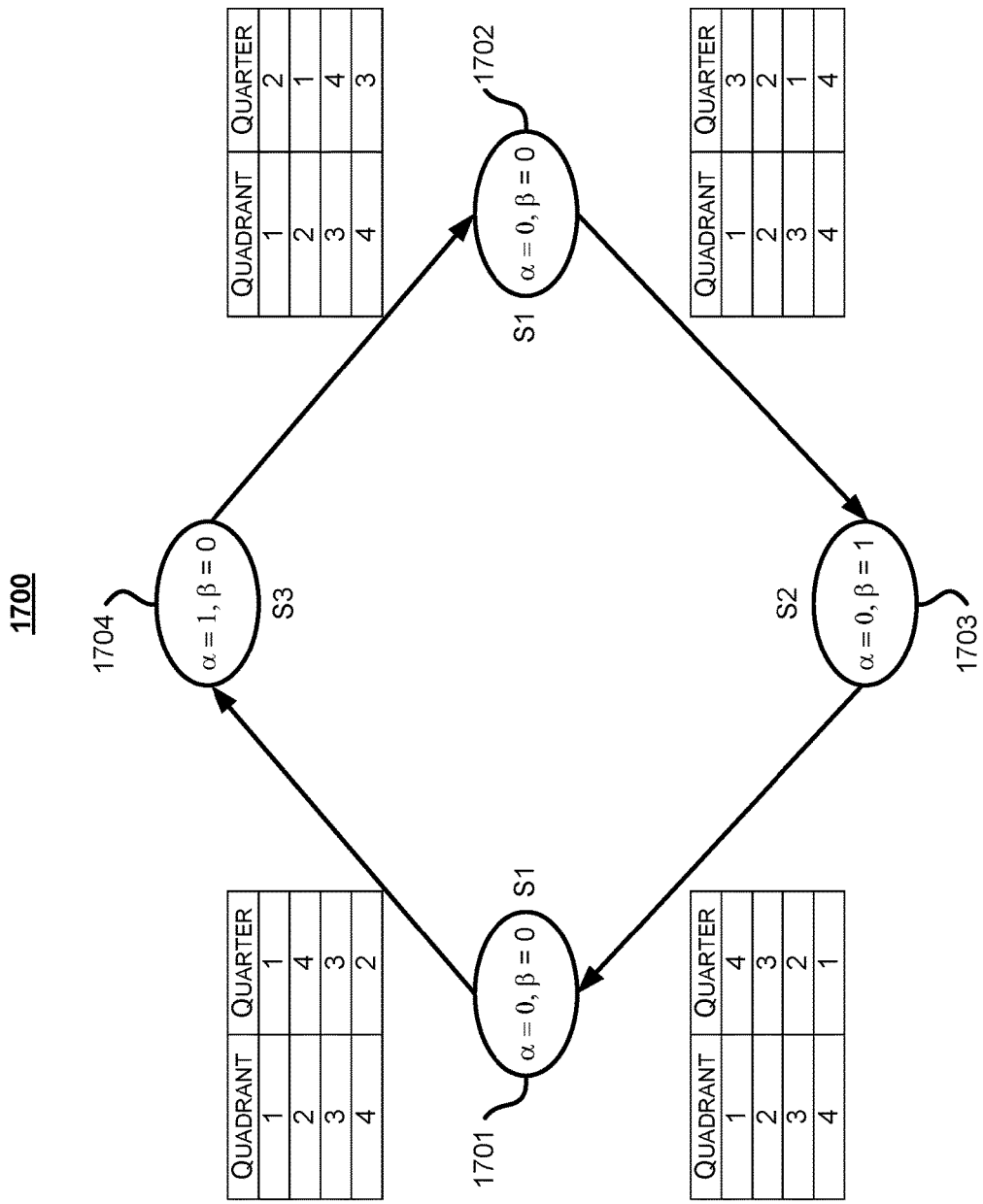
FIG. 17 illustrates a State Space diagram for power stage with transformer according to embodiments of the present inventions.

FIG. 17 illustrates a State Space diagram for power stage with transformer 1700. There are three possible states: S1 1701 and 1702, S2 1703 and S3 1704. State S1 numbered 1701 and 1702 corresponds to alpha and beta both equal to zero. State S2 1703 which corresponds to alpha equal to zero and beta equal to one. State S3 1704 corresponds to alpha equal to one and beta equal to zero. Note that the state S1 comes twice in the state diagram because the state of alpha and beta both equal to one would cause a short circuit. The conditions for the transition between states are given in the four mini tables shown on the figure. The objective of the State Space diagram is to illustrate the control action for the signals alpha and beta in accordance with the invention. In a period of the RF carrier frequency the system goes clockwise one rotation. Depending on the quadrant of the baseband signals I and Q the starting and ending point are different. Table 1 given below provides a truth table of the control action.

TABLE 1

Truth Table for system with transformer

| Starting State | | | | Ending State | |
|---|---|---|---|---|---|
| α | β | Quadrant | Quarter | α | β |
| 0 | 0 | 1 | 1 | 1 | 0 |
| 0 | 0 | 2 | 4 | 1 | 0 |
| 0 | 0 | 3 | 3 | 1 | 0 |
| 0 | 0 | 4 | 2 | 1 | 0 |
| 1 | 0 | 1 | 2 | 0 | 0 |
| 1 | 0 | 2 | 1 | 0 | 0 |
| 1 | 0 | 3 | 4 | 0 | 0 |
| 1 | 0 | 4 | 3 | 0 | 0 |
| 0 | 0 | 1 | 3 | 0 | 1 |
| 0 | 0 | 2 | 2 | 0 | 1 |
| 0 | 0 | 3 | 1 | 0 | 1 |
| 0 | 0 | 4 | 4 | 0 | 1 |
| 0 | 1 | 1 | 4 | 0 | 0 |
| 0 | 1 | 2 | 3 | 0 | 0 |
| 0 | 1 | 3 | 2 | 0 | 0 |
| 0 | 1 | 4 | 1 | 0 | 0 |

Figure 18:
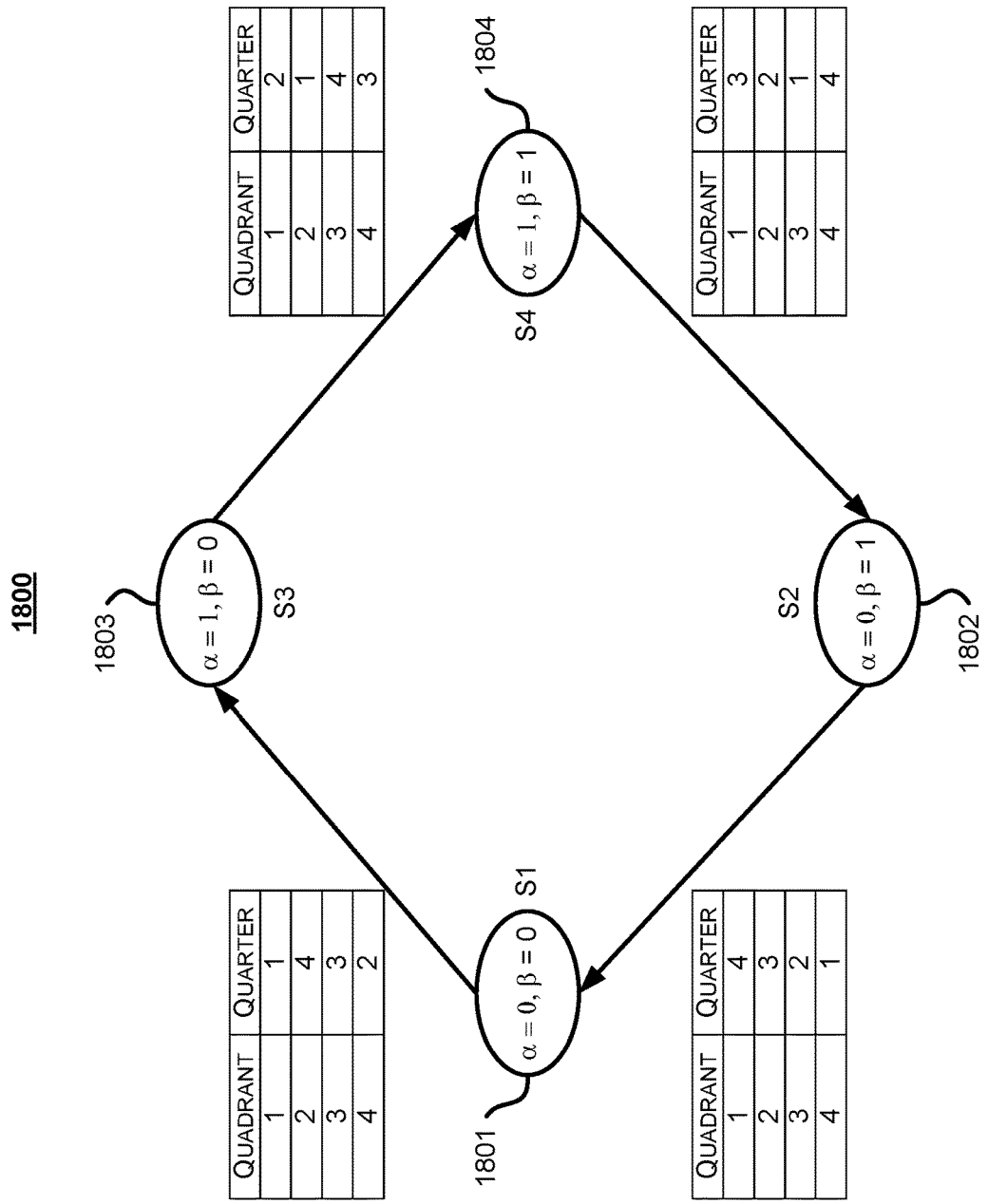
FIG. 18 illustrates a State Space diagram for transformerless power stage according to embodiments of the present inventions.

FIG. 18 illustrates a State Space diagram for a transformerless power stage 1800. There are four possible states: S1 1801, S2 1802, S3 1803 and S4 1804. State S1 numbered 1801 corresponds to alpha and beta both equal to zero. State S2 1802 which corresponds to alpha equal to zero and beta equal to one. State S3 1803 corresponds to alpha equal to one and beta equal to zero. State S4 1804 corresponds to both alpha and beta equal to one. The conditions for the transition between states are given in the four mini tables shown on the figure. The objective of the state space diagram is to illustrate the control action for the signals alpha and beta in accordance with the invention. In a period of the RF carrier frequency the system goes clockwise one rotation. Depending on the quadrant of the baseband signals I and Q the starting and ending point are different. Table 2 given below provides a truth table of the control action.

TABLE 2

Truth Table for system without transformer

| Starting State | | | | Ending State | |
|---|---|---|---|---|---|
| α | β | Quadrant | Quarter | α | β |
| 0 | 0 | 1 | 1 | 1 | 0 |
| 0 | 0 | 2 | 4 | 1 | 0 |
| 0 | 0 | 3 | 3 | 1 | 0 |
| 0 | 0 | 4 | 2 | 1 | 0 |
| 1 | 0 | 1 | 2 | 1 | 1 |
| 1 | 0 | 2 | 1 | 1 | 1 |
| 1 | 0 | 3 | 4 | 1 | 1 |
| 1 | 0 | 4 | 3 | 1 | 1 |
| 1 | 1 | 1 | 3 | 0 | 1 |
| 1 | 1 | 2 | 2 | 0 | 1 |
| 1 | 1 | 3 | 1 | 0 | 1 |
| 1 | 1 | 4 | 4 | 0 | 1 |
| 0 | 1 | 1 | 4 | 0 | 0 |
| 0 | 1 | 2 | 3 | 0 | 0 |
| 0 | 1 | 3 | 2 | 0 | 0 |
| 0 | 1 | 4 | 1 | 0 | 0 |

The signal processing techniques disclosed herein with reference to the accompanying drawings can be implemented on one or more digital signal processors (DSPs) or other microprocessors. Nevertheless, such techniques could instead be implemented wholly or partially as hardwired circuits. Further, it is appreciated by those of skill in the art that certain well known digital processing techniques are mathematically equivalent to one another and can be represented in different ways depending on choice of implementation.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A switching RF power stage modulator to generate a differential RF signal output for differentially driving an RF load modulated at an RF carrier frequency using baseband I and Q signal inputs, comprising:
   a pulse quadrature modulator operatively coupled to receive the baseband I and Q signal inputs and a high speed quantization clock and configured to generate both an alpha binary signal of one serial bit and a beta binary signal of one serial bit, each of the alpha binary signal and the beta binary signal switched at the RF carrier frequency which is a fraction of the high speed quantization clock, the alpha binary signal comprises an alpha pulse edge nominally occurring at a rate two times the RF carrier frequency, the beta binary signal comprises a beta pulse edge nominally occurring at a rate two times the RF carrier frequency, wherein the alpha pulse edge and the beta pulse edge alternate from one another over time, each of the alpha pulse edge and the beta pulse edge are synchronized to the high speed quantization clock, wherein the alpha pulse edge and the beta pulse edge are switched based on the baseband I and Q signal inputs; and
   an RF switching power stage operatively coupled to the pulse quadrature modulator to receive both the alpha binary signal and the beta binary signal to produce the differential RF signal output modulated at the RF carrier frequency for differentially driving the RF load, the RF switching power stage comprising
      a first switch operatively coupled to a power source to gate a power signal from the power source using the alpha binary signal to produce a first power output; and
      a second switch operatively coupled to the power source to gate the power signal from the power source using the beta binary signal to produce a second power output; and
   wherein the first switch and the second switch are operatively coupled to differentially drive the RF load with the differential RF signal across the first power output and the second power output having pulse edges at nominally at an integer multiple of four times the RF carrier frequency.

2. A switching RF power stage modulator according to claim 1, wherein the pulse quadrature modulator generates the alpha binary signal and the beta binary signal by counting the high speed quantization clock.

3. A switching RF power stage modulator according to claim 1,
   wherein the pulse quadrature modulator noise shapes the alpha binary signal to create the alpha pulse edge; and
   wherein the pulse quadrature modulator noise shapes the beta binary signal to create the beta pulse edge.

4. A switching RF power stage modulator according to claim 1, wherein the pulse quadrature modulator creates the alpha pulse edge and the beta pulse edge synchronized to the high speed quantization clock with alpha or beta nominally having a transition every quarter period of the RF carrier frequency based on a quadrant of the baseband I and Q signal inputs and the quarter period of the RF carrier frequency.

5. A switching RF power stage modulator according to claim 1, wherein the RF switching power stage produces the differential RF signal output comprising complex I and Q modulation.

6. A switching RF power stage modulator according to claim 5, wherein the RF switching power stage produces the differential RF signal output comprising the complex I and Q modulation is a frequency modulated (FM) signal.

7. A switching RF power stage modulator according to claim 5, wherein the RF switching power stage produces the differential RF signal output comprising the complex I and Q modulation comprises a frequency modulated (FM) signal and an amplitude modulated (AM) signal.

8. A switching RF power stage modulator according to claim 1, wherein the first switch and the second switch differentially drive a balanced output.

9. A switching RF power stage modulator according to claim 8,
   wherein the RF load is an unbalanced RF load; and
   wherein the switching RF power stage modulator further comprises a balun for converting the balanced output to drive the unbalanced RF load.

10. A switching RF power stage modulator according to claim 1, wherein the RF load comprises an RF antenna.

11. A method of switching to generate a differential RF signal output for differentially driving an RF load modulated at an RF carrier frequency using baseband I and Q signal inputs, comprising the steps of:
   (a) generating both an alpha binary signal of one serial bit and a beta binary signal of one serial bit, each of the alpha binary signal and the beta binary signal switched at the RF carrier frequency which is a fraction of a high speed quantization clock, the alpha binary signal comprising an alpha pulse edge nominally occurring at a rate two times the RF carrier frequency, the beta binary signal comprising a beta pulse edge nominally occurring at a rate two times the RF carrier frequency, wherein the alpha pulse edge and the beta pulse edge alternate from one another over time, each of the alpha pulse edge and the beta pulse edge synchronized to the high speed quantization clock, wherein the alpha pulse edge and the beta pulse edge are switched based on the baseband I and Q signal inputs;
   (b) gating a power signal using the alpha binary signal to produce a first power output;

(c) gating the power signal using the beta binary signal to produce a second power output; and (d) differentially driving the RF load with the differential RF signal output across the first power output and the second power output modulated at the RF carrier frequency having pulse edges at nominally at an integer multiple of four times the RF carrier frequency based on the first power output gated in said step (b) and the second power output gated in said step (c).

12. A method of switching according to claim 11, wherein said step (a) of generating comprises the substeps of
(a)(1) generating the alpha binary signal by counting the high speed quantization clock; and
(a)(2) generating the beta binary signal by counting the high speed quantization clock.

13. A method of switching according to claim 11,
wherein said step (a) of generating comprises the substeps of (a)(1) noise shaping the alpha binary signal to create the alpha pulse edge; and
wherein said step (a) of generating comprises the substeps of (a)(2) noise shaping the beta binary signal to create the beta pulse edge.

14. A method of switching according to claim 11, wherein said step (a) of generating comprises the substep of
(a)(1) creating the alpha pulse edge and the beta pulse edge synchronized to the high speed quantization clock with alpha or beta nominally having a transition every quarter period of the RF carrier frequency based on a quadrant of the baseband I and Q signal inputs and the quarter period of the RF carrier frequency.

15. A method of switching according to claim 11, wherein said step (d) of differentially driving the RF load comprises the substep of (d)(1) producing the differential RF signal output comprising complex I and Q modulation.

16. A method of switching according to claim 15, wherein said step (d)(1) of producing the differential RF signal output comprises the substep of (d)(1)(i) producing the differential RF signal output as a frequency modulated (FM) signal.

17. A method of switching according to claim 15, wherein said step (d)(1) of producing the differential RF signal output comprises the substep of (d)(1)(i) producing the differential RF signal output as a frequency modulated (FM) signal and an amplitude modulated (AM) signal.

18. A method of switching according to claim 11, wherein said step (d) of differentially driving the RF load comprises the substep of (d)(1) differentially driving a balanced output.

19. A method of switching according to claim 18,
wherein the RF load differentially driven by the balanced output of said step (d)(1) is an unbalanced RF load; and
wherein said substep (d)(1) of differentially driving a balanced output comprises the substeps of
(d)(1)(i) converting the differential RF signal output to and unbalanced RF signal output; and
(d)(1)(ii) driving the unbalanced RF load with the unbalanced RF signal output.

20. A method of switching according to claim 11, wherein the RF load differentially driven by said step (d) comprises an RF antenna.

* * * * *